United States Patent

[11] 3,545,612

[72] Inventor Harold J. Mumma
 Riverside, California
[21] Appl. No. 801,304
[22] Filed Feb. 24, 1969
[45] Patented Dec. 8, 1970
[73] Assignee FMC Corporation
 San Jose, California
 a corporation of Delaware

[54] FRUIT SIZING APPARATUS
 12 Claims, 8 Drawing Figs.
[52] U.S. Cl. .................................................. 209/84
[51] Int. Cl. ........................................... B01d 21/00
[50] Field of Search ......................................... 209/84,
 100, 102, 103

[56] References Cited
 UNITED STATES PATENTS
3,019,898 2/1962 Bertinot ..................... 209/102

3,348,679 10/1967 Russell ..................... 209/84

*Primary Examiner*—Allen N. Knowles
*Attorneys*—F. W. Anderson and C. E. Tripp

ABSTRACT: A sizing apparatus for fruit or vegetables of generally rounded shape comprises a plurality of uniformly spaced rollers arranged in fixed positions between a pair of endless chains which are adapted to be continuously driven. Between each pair of fixed rollers is a movable roller which is mounted between the endless chains for movement upwardly away from the fixed rollers as the chains are carried horizontally over a sizing zone. As the movable roller is moved away from the fixed rollers the spacing between the rollers is thereby progressively increased and a fruit received upon the rollers will be deposited upon a particular underlying takeaway conveyor at a position along said sizing zone in accordance with the diameter of said fruit.

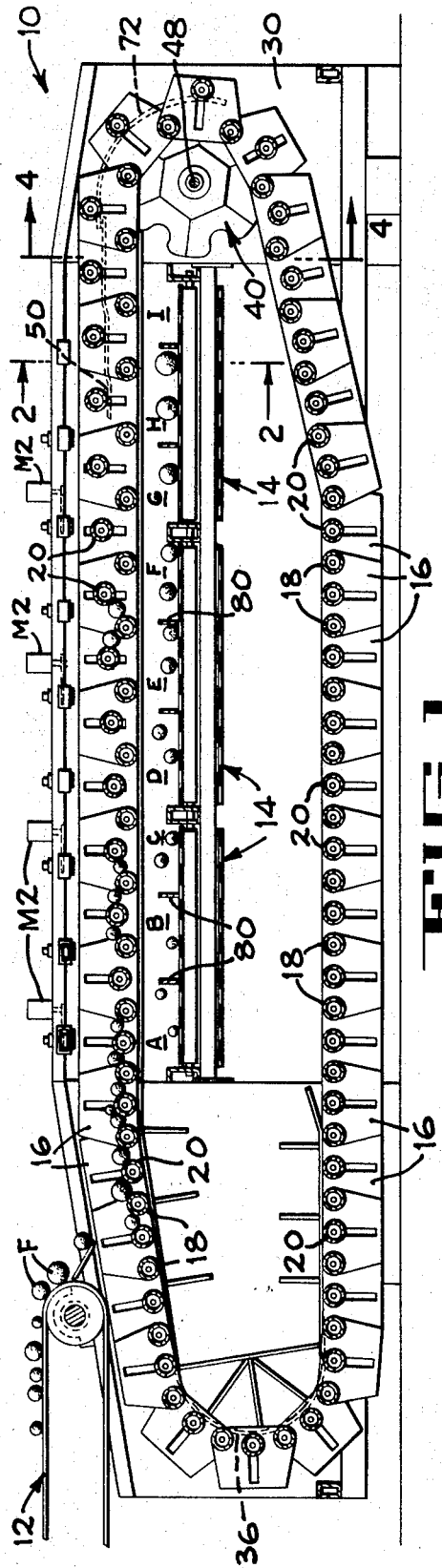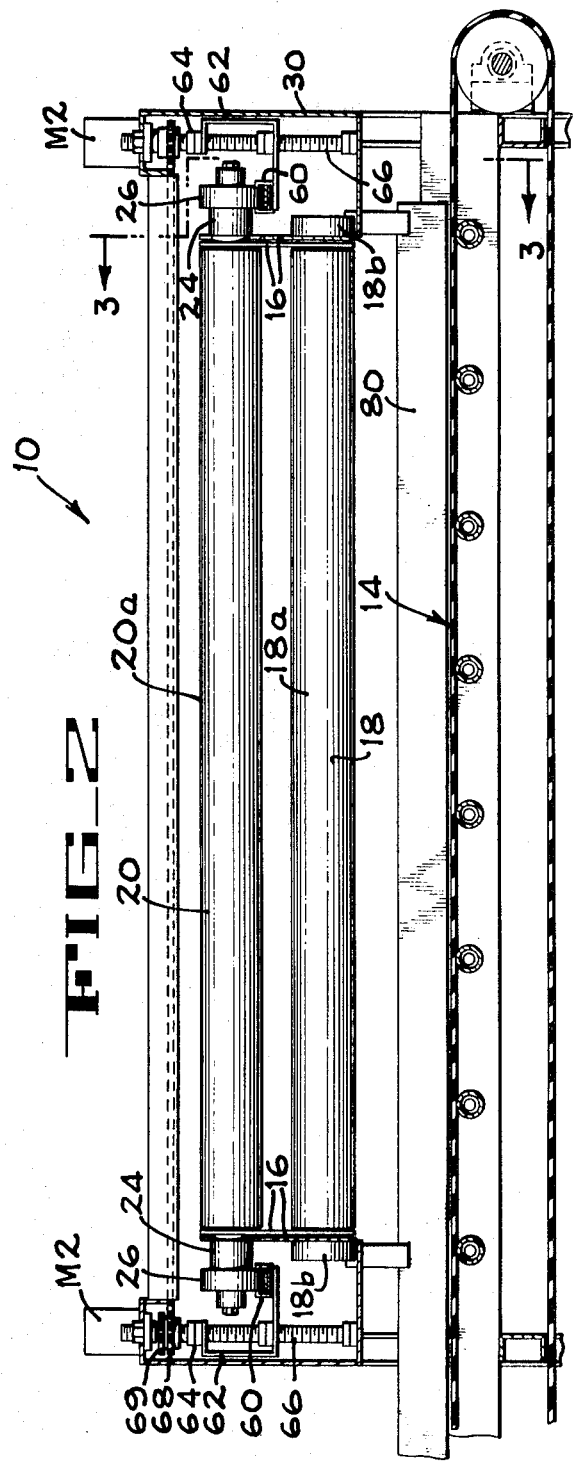

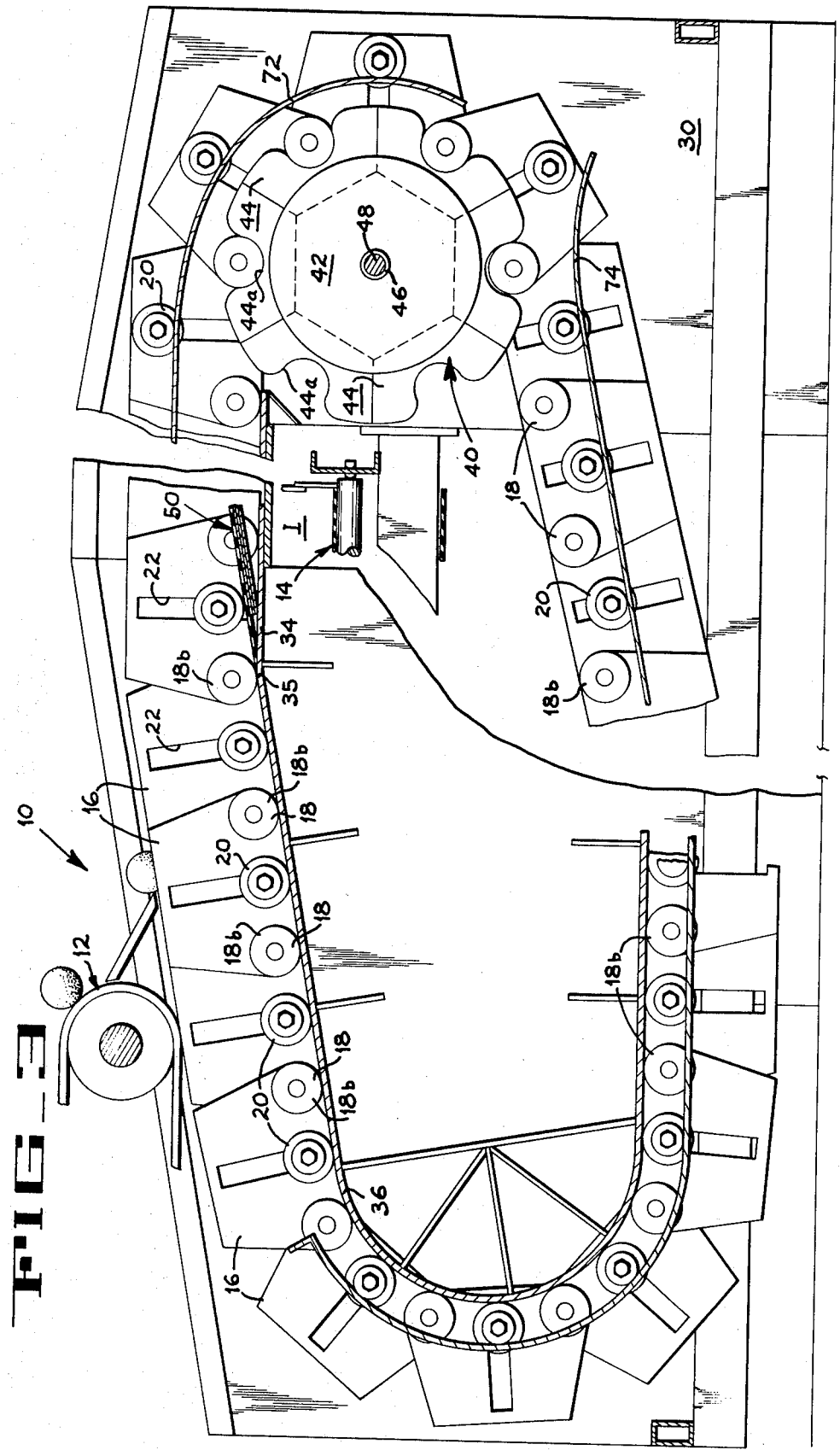

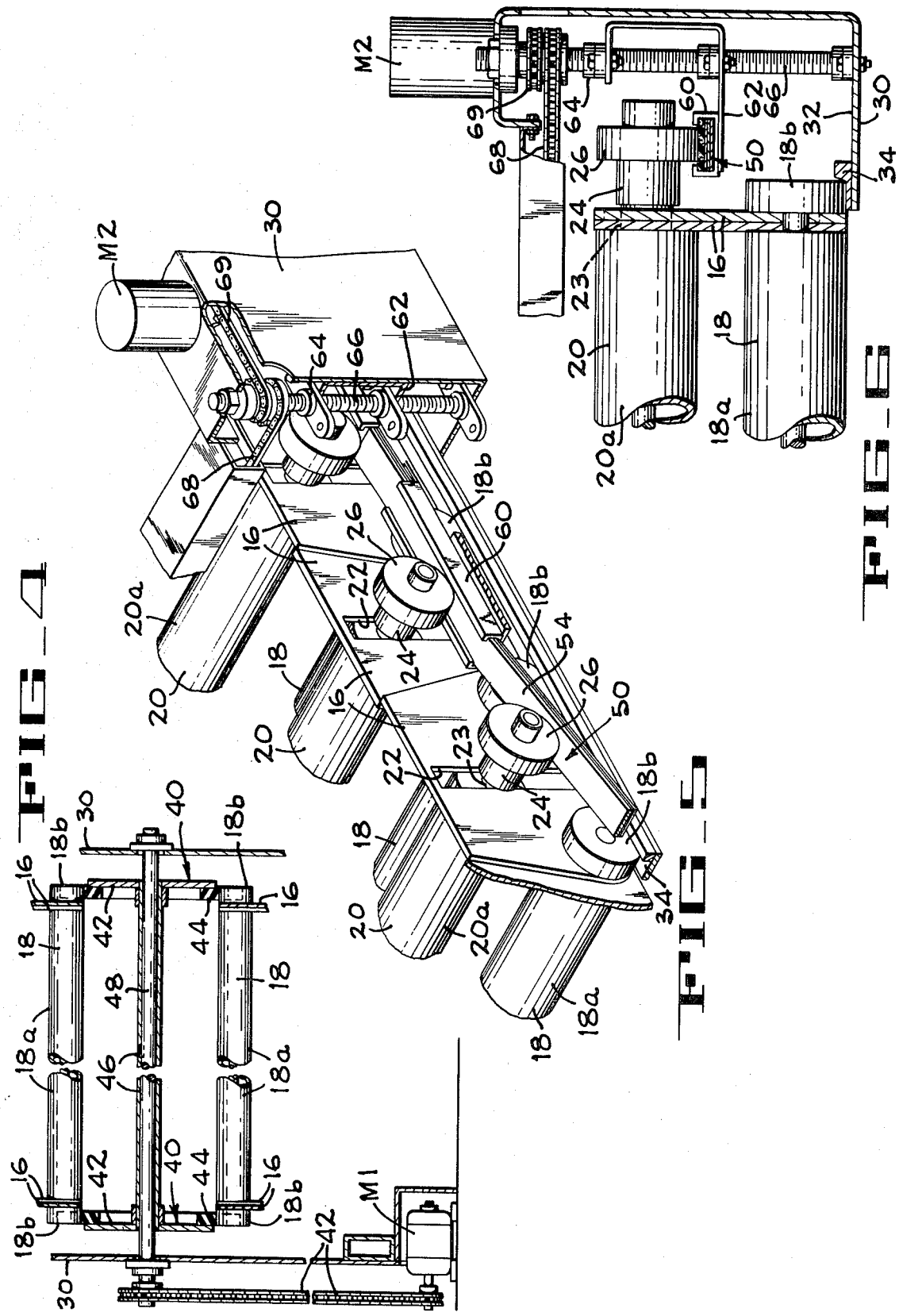

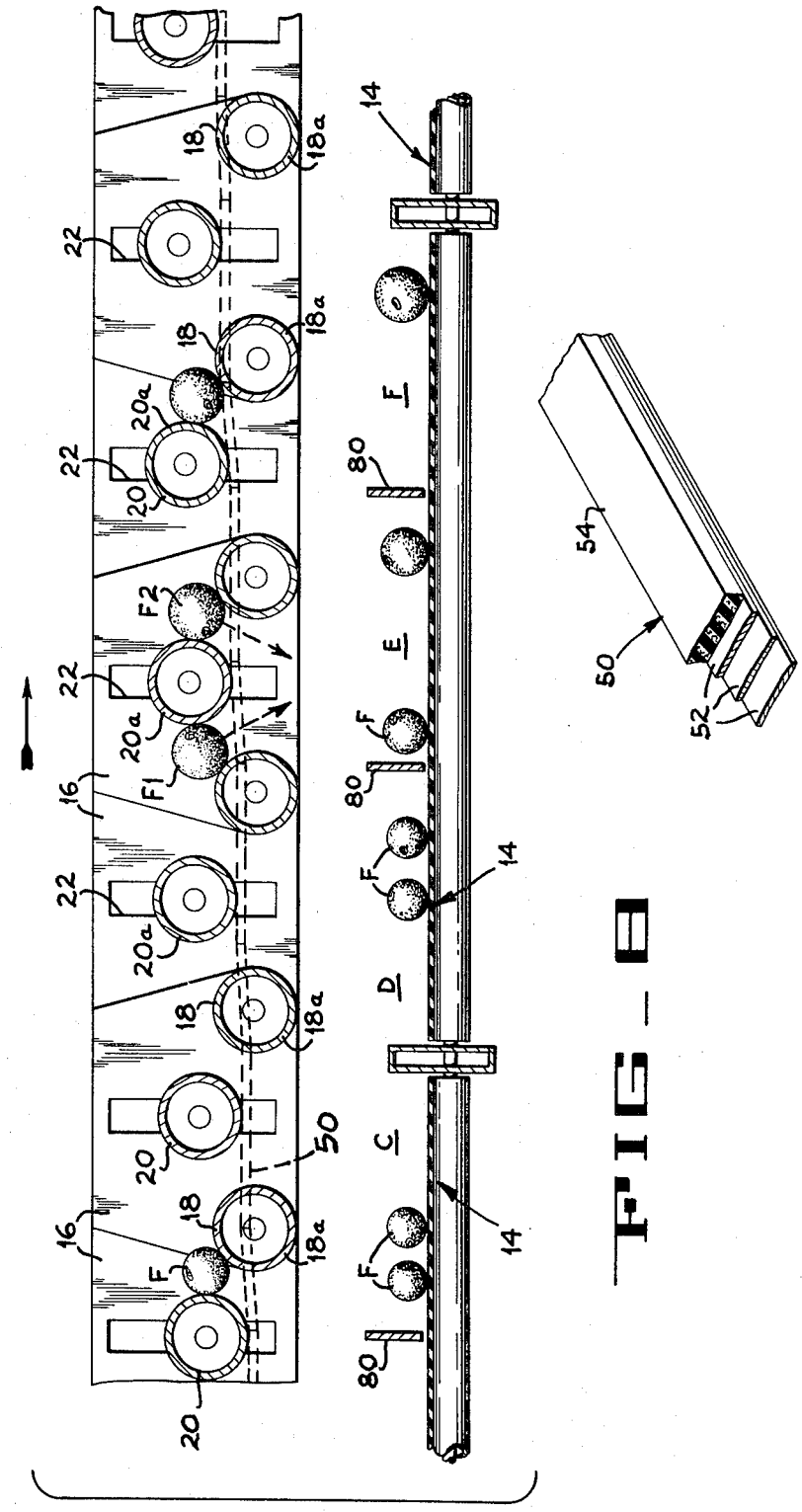

FRUIT SIZING APPARATUS

BACKGROUND OF THE INVENTION

1. Field of the Invention

In general, this invention pertains to that field of art concerned with sizing apparatus, and more particularly, it pertains to sizing apparatus for fruits or vegetables of generally rounded shape where the sizing operation is accomplished automatically through the slots provided by a plurality of spaced conveying rollers.

2. Description of the Prior Art

For many years in the fresh fruit and vegetable packing and processing industries a very popular apparatus among the conveyor roll type sizers has been the drop roll sizer a commercial version of which is disclosed in U.S. Pat. No. 2,467,651 to Balduf. With this sizer a plurality of parallel conveyor rollers are arranged between a pair of endless, continuously-driven chains. Between each pair of adjacent conveyor rollers there is provided a movable roller, or so called drop roll, which is slidably mounted so that it may be lowered with respect to the conveyor rollers as they traverse the sizing zone. The fresh fruit or vegetable to be graded are dumped upon the rollers at one end of the zone when the drop rolls are in their uppermost positions, and as the fruit is carried above a series of separate grading tables or the like, the drop rolls are gradually lowered to progressively increase the spacing between the drop rolls and the adjacent conveyor rollers and thereby permit the fruit to drop through the conveyor to the proper underlying grading table in accordance with its maximum diameter.

The particular drop roll sizer described has achieved a wide popularity in the fresh produce packing and processing industries since it can handle a typical field run of fruit with a wide range of product sizes. Also, it may be built to handle significant quantities of fruit at one time for large scale commercial operations.

Despite these advantages, the prior art drop roll sizer has certain disadvantages which have long plagued it and for which solutions were not provided prior to the present invention. For example, the grading tables or take-away conveyors which underlie the sizing run of the conveyors must be positioned a distance below the fixed conveyor rollers which is at least equal to the maximum distance that the movable rollers will be dropped during the complete sizing run plus the diameter of the largest fruit being handled. This dropping distance, which can be considerable in cases where a wide range of fruit sizes is encountered, has often resulted in bruising and damage where soft fruit such as peaches or ripe tomatoes are processed.

A further disadvantage of the prior art drop roll sizer is the fact that, as a drop roll is lowered below the plane of the adjacent fixed rollers, the fruit of the proper size to be discharged will flow past the drop roll both rearwardly and forwardly with respect to the direction of motion of the rollers. That is to say, at the instant when the roller gap is widened to allow the next largest fruit size to be dropped to the underlying grading station, the fruit is permitted to be discharged both forwardly and rearwardly of the lowered movable roller and, therefore, over a relatively wide area. For this reason, the separate grading stations must be spaced relatively far apart so that there will be no overlap in the discharge to the separate sizes. As a consequence of this inherent problem, the sizing conveyors of the prior art have necessarily been lengthy and, therefore, not always easily adaptable to commercial packing or processing plant installations.

SUMMARY OF THE INVENTION

The present invention provides an improved sizing apparatus which, while generally based upon the aforedescribed drop roll sizer as set forth in prior U.S. Pat. No. 2,467,651, does provide significant functional advantages over the prior art machine that make it both more efficient and economical for the user. In the present invention an endless conveyor is provided which is generally comprised of a plurality of fixed or primary rollers and a plurality of movable rollers positioned intermediately of each pair of primary rollers as in the prior art. However, in the present invention, means are provided adjacent to the horizontal sizing run of the apparatus to shift the movable rollers vertically upward with respect to the plane of the primary rollers so that the fruit will be sized and discharged beneath the movable rollers rather than above them as with the prior art structure.

This improved structure provides at least two significant advantages. First, the grading conveyors may be positioned beneath the rollers by a distance equal to no more than the diameter of the largest fruit to be sized. This results in a smaller total drop for the fruit and is of great value in lessening the damage to soft and easily bruised products such as peaches and tomatoes.

Secondly, it will be recognized that the raising of a movable roller will cause the fruit of the proper size to be discharged directly beneath that roller through a single pair of fixed or primary rollers. Since, at the instant that the movable roller is raised, the fruit will be discharged over a relatively narrow area, the total length of each separate sizing area can be decreased and a closer separation of the size grades can be obtained. With this increase in the available space, a sizer of the same fruit handling capacity as the prior art design can be built more compactly with a smaller overall length and thereby become more efficient from the viewpoint of the ultimate user who must fit such machinery within his existing plant facilities.

One further advantage of the present machine is the flexible guide track which accomplishes the steplike raising of the movable rollers. This guide track is made up of a plurality of flat spring sections which are fixed only at one end thereof so that they may slide axially relative to each other as the various intermediate portions of the track are raised or lowered to accommodate different size grades.

A continuous uniformly curved track section may therefore be maintained so that the movable rollers will be smoothly transferred from one elevation to another throughout the sizing zone of the apparatus to thereby avoid the noise and wear inherent in a drop roll sizer structure wherein a sharp break occurs between each shift in elevation of the drop rolls.

BRIEF DESCRIPTION OF THE DRAWINGS

FIG. 1 is a longitudinal section through the sizing apparatus of the present invention.

FIG. 2 is an enlarged transverse section taken generally along the line 2–2 of FIG. 1.

FIG. 3 is an enlarged longitudinal section through the sizing apparatus shown in FIG. 1 taken generally along the line 3–3 of FIG. 2 and with the central portion of the apparatus being broken away.

FIG. 4 is an enlarged transverse section taken along the line 4–4 of FIG. 1.

FIG. 5 is an isometric view showing the cam track for elevating the movable rollers and the adjustment means therefor.

FIG. 6 is an enlarged detailed view of a portion of the structure shown in FIG. 2 particularly illustrating the mounting of the rollers and the adjustment means therefor.

FIG. 7 is a diagrammatic view illustrating the sizing operation of the apparatus shown in FIG. 1.

FIG. 8 is a detail of a portion of one of the cam tracks.

DESCRIPTION OF THE PREFERRED EMBODIMENT

In the preferred embodiment of the invention a sizing apparatus 10 is provided (FIGS. 1 and 2) which is adapted to receive bulk supplies of fruit F at one end thereof from a supply conveyor 12 and to deposit such fruit upon a plurality of transversely extending take-away conveyors 14 each of which has been subdivided to form a sizing zone comprised of a series of adjacent grading stations A through I. The sizing apparatus is comprised of a pair of endless conveyor chains each of which is made up of a plurality of overlapped and interconnected plates 16 of generally trapezoidal shape. Connected between the chains are a plurality of primary, or fixed, rollers 18 and interposed movable rollers 20 with the rotating surfaces of the rollers forming the conveying surface above the sizing zone. By means to be disclosed in greater detail hereinafter, the movable rollers are moved upwardly away from the plane of the primary rollers to leave an ever widening gap between the rollers through which each individual item of fruit will eventually pass. The fruit will therefore be dropped to an underlying conveyor at the proper grading station along the length of the sizing zone in accordance with the maximum diameter of the fruit.

The rollers 16 and 18 of the sizing apparatus are continuously rotated as they pass over the sizing zone in order to agitate the fruit and cause it to axially aline itself within the gaps formed between the adjacent rollers. Obviously, the apparatus will properly size any spherically shaped product, and it may further be used for any product which is of generally rounded shape. For example, the apparatus of the present invention can be used to successfully size such varied products as oranges, lemons, peaches, or tomatoes.

Each of the primary rollers 18 is comprised of an elongated central section 18a and a pair of attached end portions 18b (FIG. 2) all of which are adapted to be rotated as a single unit. Each primary roller is rotatably secured at the overlapped corners of a pair of adjacent plates 16 (as shown in FIGS. 2 or 6) with the end portions 18b extending exteriorly of the plates. An elongated slot 22 is provided centrally of each plate with its axis extending perpendicularly to the plane of the attached rollers 18 in order to provide a slidable mounting for the lateral extensions of the movable rollers 20.

As best shown in FIG. 6, each movable roller 20 includes an elongated central section 20a within the plates 16 and extending parallel to the fixed roller sections 18a. A narrow neck 23 at each end of the roller loosely extends through the slot 22 in the adjacent mounting plate 16, and an enlarged hub 24 axially secures the roller to the plates. A pair of skate wheels 26 are rigidly attached at the outermost ends of each roller for supporting it during movement of the conveyor chains. It will be appreciated that each movable roller 20 is therefore slidably attached between a pair of mounting plates located at opposite sides of the structure so that it is only permitted to move perpendicularly with respect to the plane of the primary rollers 18 which are also rotatably connected between the plates.

The general frame structure 30 of the sizing apparatus includes, along each upper side thereof, an inwardly extending, horizontally located flange 32 (FIG. 6) upon which is located a track section 34 adapted to engage and rollably support the lateral end portions 18b of the primary rollers. At the fruit input end of the apparatus the primary rollers are trained about curved track sections 36 which particularly support the conveyors as they move into the upper runs thereof. As shown at point 35 in FIG. 3, each track section 36 mates with and forms an extension of one of the horizontal track sections 34 so that the conveying rollers will be smoothly transferred from the fruit pickup zone into the sizing zone.

The sizing apparatus of the present invention is adapted to be driven from the downstream end thereof by a pair of drive sprockets 40 (FIGS. 3 and 4). Each of these drive sprockets comprises a circular supporting plate 42 to which there is circumferentially attached in continuous relationship six pocketed roller supporting members 44 of rubber or rubberlike material. The pockets 44a of the supporting members are spaced about the circumference of the sprocket so that they will resiliently engage the outer ends of the elongate central portions 18a of the primary rollers and thereby supply the driving force to the conveyors. As best shown in FIG. 4, the supporting plates 42 of the drive sprockets are provided with center apertures which are attached about a tubular member 46 that is, in turn, rigidly attached to a drive shaft 48 extending transversely of the apparatus. A motor M1 and drive chain 42 are provided to continuously rotate the drive shaft exteriorly of the frame structure 30 of the apparatus. The drive shaft is keyed to the tubular member 46 which supports the drive sprockets only at the central portion thereof (FIG. 4) so that the torque supplied by the motor will be applied equally to both drive sprockets.

A special feature of the present invention is the means for guiding the movable rollers 20 upwardly away from the plane of the primary rollers 18 as the primary rollers move over the track sections 34 above the grading stations. To accomplish this shifting of the movable rollers, a pair of flexible tracks 50 are provided for rolling engagement by the skate wheels 26 at the lateral ends of the rollers. These tracks, a portion of one of which is shown in detail in FIG. 8, comprise a plurality of spring steel sections 52 which are attached together at one longitudinal end of the track only. At the other end thereof the sheetlike members 52 are free to shift longitudinally relative to each other so that the track may be bent at various elevations along its length. Attached to the uppermost spring section of the track is a rubber belting strap 54 which provides a friction surface for the skate wheels 26 and also serves to reduce the running noise of the apparatus.

As shown in FIGS. 5 and 6, the guide tracks 50 are adapted to be supported at various particular elevations along their length by means of channels 60 which underlie and bend the track into a short horizontal grading run. Each channel is mounted upon a generally U-shaped bracket 62 which is provided with threaded mounts 64 that adjustably position it upon a threaded rod 66 extending vertically within the side frame structure 30 of the apparatus. Each pair of rods 66 which are received at a common longitudinal position but at the opposite sides of the conveyor are interconnected by means of an endless chain 68 (FIG. 2) so that they may be rotated as a unit. One rod out of a each interconnected pair is adapted to be rotated for adjustment of the guide tracks by means of a motor M2 which drives a chain 69 sprocketed to the upper end of the rod.

It will be appreciated that the elevation of the guide tracks 50 at any point along their length may be adjusted by switching on one of the motors M2 (by means not shown) to rotate the connected pair of adjustment rods 66 and thereby raise or lower the associated supporting channels 60 which fix the track at a particular elevation. Means may also be provided for simultaneously energizing all of the drive motors M2 so that the entire length of the guide tracks 50 will be uniformly raised or lowered.

The movable rollers 20 are arranged to pass from the guide tracks 50 to curved track extensions 72 (one only shown in FIGS. 1 and 3) as they are carried about the drive sprockets 40. As the conveyor chains move into their lower runs they are arranged to be supported by the movable rollers rather than the primary rollers. The skate wheels 26 are therefore adapted to be received upon a track section 74 (FIG. 3) which picks the rollers up beneath the drive sprockets and carries them along the lower conveyor run of the apparatus and around the fixed track section 36 at the input end of the apparatus.

The central portion of the grading stations, including stations C—F, is shown in FIG. 7 wherein it can be seen that each of the transverse conveyors 14 is adapted to receive the fruit F which drops through the rollers and direct it away from the apparatus to packing tables or other processing stations. A series of baffles or divider members 80 are provided along the upper runs of the conveyors 14 to divide each conveyor into three separate grading stations. As can be seen from FIG. 7, each of these grading stations has its lefthand edge located directly below the position where the flexible tracks 50 are moved upwardly to a new elevation as determined by the positioning of the support channels 60. Since, in the embodiment shown, there are nine sets of elevation-setting channels arranged along the length of the sizing zone, there are also nine grading stations positioned therebeneath. As a movable roller is shifted to each new elevation it will be received above a new grading station which will catch all of the fruit passed through the widened gap between the rollers caused by such shift.

It is important to note that fruit which is received upon the rollers will move in two directions beneath them movable roller as that particular roller is shifted upwardly. For example, in FIG. 7, the fruits F1 and F2, if of the same size, will drop in the direction of the arrows as indicated when the movable roller on which they are supported is shifted upwardly far enough to permit them to pass. The fruit F1 and F2 will therefore move in converging directions during the upward lifting of the movable roller. This is in direct contrast to the prior art drop roll structures which let the fruit drop in diverging directions during the lowering of the movable roller; consequently, the apparatus of the present invention is seen to permit a separation of the fruit over a relatively narrow area which means that a smaller (i.e., less wide) grading station can be used to receive and transversely convey away the same amount of fruit sized by a prior art sizer of similar capacity.

It will be appreciated, therefore, that the apparatus of the present invention provides a sizing device which is adapted to handle a large quantity of fruit and to quickly and efficiently size the same without requiring undue conveying space in order to accurately separate the various size grades. Furthermore, the flexible guiding or camming tracks which are used to shift the movable rollers upwardly from the fixed or primary rollers are flexible enough to permit the various transitions in elevation required to be made smoothly thereby reducing the noise and wear on the apparatus. Adjustments to change the elevations of the tracks along the length of the conveyors can be easily obtained by shifting the supporting members of the tracks which shifting is readily provided for due to the flexible nature of the tracks.

Although the best mode contemplated for carrying out the present invention has been herein shown and described, it will be apparent that modification and variation may be made without departing from what is regarded to be the subject matter of the invention.

I claim:

1. A sizing apparatus for produce of generally rounded shape comprising an endless conveyor having a horizontal run overlying a plurality of separate grading stations, said conveyor including a plurality of rotatably mounted primary rollers arranged at uniform intervals and in parallel relationship and a plurality of alined movable rollers uniformly spaced between each pair of primary rollers, means mounting each of said movable rollers upon said conveyor for upward vertical movement with respect to said primary rollers, and means positioned adjacent to said horizontal run and arranged to progressively elevate said movable rollers above said primary rollers when they pass over said grading stations in order to permit an item of produce to fall through the spacings between said rollers to a particular underlying grading station in accordance with the maximum diameter of said item of produce.

2. A sizing apparatus according to claim 1 wherein said elevating means comprises a pair of cam tracks positioned adjacent to the lateral ends of said movable rollers for engagement therewith.

3. A sizing apparatus according to claim 2 including a plurality of individually adjustable mounting members supporting said cam tracks at spaced positions along the length thereof, and means for selectively raising or lowering said mounting members in order to vary the sizing operation of said apparatus.

4. A sizing apparatus according to claim 3 wherein said cam tracks comprise continuous strips of flexible material provided with an upper friction surface, wherein each end of each of said movable rollers is provided with a narrow roller section rollably engageable with the friction surface on the adjacent cam track, and wherein each of said mounting means comprises a channel underlying said track and a threaded rod rotatably secured to the conveyor frame structure and threadably attached to said channel.

5. A sizing apparatus according to claim 4 wherein each of said cam tracks is comprised of a plurality of flat spring members which are rigidly joined together only at one end thereof so that they are free to slide axially relative to one another during vertical adjustment of the track.

6. A sizing apparatus according to claim 1 wherein said conveyor includes a plurality of interconnected plates with each of said plates rotatably mounting an adjacent pair of primary rollers, each of said plates having a slot in the center thereof extending perpendicularly to the plane of said primary rollers for slidably mounting one end of the movable roller which is positioned between said pair of primary rollers.

7. A sizing apparatus according to claim 5 wherein said elevating means comprises a pair of cam tracks arranged adjacent to said interconnected plates for engagement with the end portions of said movable rollers which project through said slots in said plates.

8. A sizing apparatus according to claim 6 including a continuously driven sprocket having a plurality of circumferentially spaced pockets for successively receiving said primary rollers and thereby propelling said conveyor.

9. A sizing apparatus for produce of generally rounded shape comprising an endless conveyor having a horizontal run overlying a plurality of separate grading stations, said conveyor including a plurality of primary rollers arranged at uniform intervals and in parallel relationship and a plurality of alined movable rollers uniformly spaced between each pair of primary rollers, means rotatably mounting each of said movable rollers upon said conveyor for vertical movement with respect to said primary rollers in said horizontal run, and a pair of tracks arranged along said horizontal run adjacent to the lateral ends of said movable rollers for progressively guiding said movable rollers away from said primary rollers as they pass over said grading stations in order to permit each item of produce to fall through the spacings between said rollers to a particular underlying grading station in accordance with the maximum diameter of said item of produce, said tracks comprising a plurality of flexible metal strips rigidly secured together only at one end thereof and being therefore free to move axially relative to each other.

10. A sizing apparatus according to claim 9 including a plurality of vertically adjustable mounting members for supporting each of said tracks at a plurality of predetermined elevations along the length thereof.

11. A sizing apparatus according to claim 10 wherein each of said mounting members comprises a channel underlying said track and a threaded rod rotatably secured to the conveyor frame structure and threadedly attached to said channel.

12. A sizing apparatus according to claim 10 wherein said tracks are provided with a friction surface of rubberlike material for rolling engagement with the projecting ends of said movable rollers.